US011093617B2

(12) United States Patent
Zettel, II et al.

(10) Patent No.: US 11,093,617 B2
(45) Date of Patent: Aug. 17, 2021

(54) AUTOMATED VULNERABILITY GROUPING

(71) Applicant: ServiceNow, Inc., Santa Clara, CA (US)

(72) Inventors: Kurt Joseph Zettel, II, Santa Clara, CA (US); Lisa Henderson, Santa Clara, CA (US); Phillip DiCorpo, Santa Clara, CA (US); Volodymyr Osypov, Santa Clara, CA (US); Karan Shah, Santa Clara, CA (US); Xuchang Chen, Santa Clara, CA (US); Jerome Liu, Santa Clara, CA (US)

(73) Assignee: ServiceNow, Inc., Santa Clara, CA (US)

( * ) Notice: Subject to any disclaimer, the term of this patent is extended or adjusted under 35 U.S.C. 154(b) by 210 days.

(21) Appl. No.: 15/815,155

(22) Filed: Nov. 16, 2017

(65) Prior Publication Data

US 2019/0102560 A1  Apr. 4, 2019

Related U.S. Application Data

(60) Provisional application No. 62/568,087, filed on Oct. 4, 2017.

(51) Int. Cl.
*G06F 21/57* (2013.01)
*H04L 29/06* (2006.01)
*G06F 21/55* (2013.01)
*G06F 11/30* (2006.01)
*G06F 11/32* (2006.01)

(52) U.S. Cl.
CPC ........ *G06F 21/577* (2013.01); *G06F 11/3006* (2013.01); *G06F 11/3051* (2013.01); *G06F 11/324* (2013.01); *G06F 21/552* (2013.01); *H04L 63/1433* (2013.01); *H04L 63/20* (2013.01)

(58) Field of Classification Search
CPC . G06F 21/577; G06F 21/552; H04L 63/1433; H04L 63/20
USPC .......................................................... 726/25
See application file for complete search history.

(56) References Cited

U.S. PATENT DOCUMENTS

| | | | |
|---|---|---|---|
| 6,321,229 B1 | 11/2001 | Goldman | |
| 6,574,737 B1* | 6/2003 | Kingsford | ........... H04L 63/1433 709/224 |
| 6,609,122 B1 | 8/2003 | Ensor | |
| 6,799,189 B2 | 9/2004 | Huxoll | |
| 6,816,898 B1 | 11/2004 | Scarpelli | |
| 6,895,586 B1 | 5/2005 | Brasher | |
| 7,020,706 B2 | 3/2006 | Cates | |
| 7,027,411 B1 | 4/2006 | Pulsipher | |
| 7,028,301 B2 | 4/2006 | Ding | |
| 7,062,683 B2 | 6/2006 | Warpenburg | |
| 7,131,037 B1 | 10/2006 | LeFaive | |

(Continued)

OTHER PUBLICATIONS

Extended European Search Report for European Application No. 18198534.2 dated Feb. 18, 2019; 8 pgs.

*Primary Examiner* — Tae K Kim
*Assistant Examiner* — Peiliang Pan
(74) *Attorney, Agent, or Firm* — Fletcher Yoder PC

(57) ABSTRACT

Systems and methods for automatically grouping vulnerabilities into vulnerability groups are provided. Vulnerabilities are received in the vulnerability response system and are automatically grouped into one or more vulnerability groups based upon grouping fields defined in a vulnerability group rule.

20 Claims, 7 Drawing Sheets

(56) References Cited

U.S. PATENT DOCUMENTS

| | | | |
|---|---|---|---|
| 7,170,864 B2 | 1/2007 | Matharu | |
| 7,350,209 B2 | 3/2008 | Shum | |
| 7,392,300 B2 | 6/2008 | Anantharangachar | |
| 7,610,512 B2 | 10/2009 | Gerber | |
| 7,617,073 B2 | 11/2009 | Trinon | |
| 7,685,167 B2 | 3/2010 | Mueller | |
| 7,689,628 B2 | 3/2010 | Garg | |
| 7,716,353 B2 | 5/2010 | Golovinsky | |
| 7,769,718 B2 | 8/2010 | Murley | |
| 7,774,361 B1* | 8/2010 | Nachenberg | G06F 21/552 707/779 |
| 7,783,744 B2 | 8/2010 | Garg | |
| 7,793,348 B2* | 9/2010 | Lingafelt | H04L 63/1433 713/189 |
| 7,890,802 B2 | 2/2011 | Gerber | |
| 7,925,981 B2 | 4/2011 | Pourheidari | |
| 7,926,113 B1* | 4/2011 | Gula | H04L 63/1425 726/25 |
| 7,930,396 B2 | 4/2011 | Trinon | |
| 7,933,927 B2 | 4/2011 | Dee | |
| 7,945,860 B2 | 5/2011 | Vambenepe | |
| 7,966,398 B2 | 6/2011 | Wiles | |
| 8,051,164 B2 | 11/2011 | Peuter | |
| 8,082,222 B2 | 12/2011 | Rangarajan | |
| 8,151,261 B2 | 4/2012 | Sirota | |
| 8,224,683 B2 | 7/2012 | Manos | |
| 8,266,096 B2 | 9/2012 | Navarrete | |
| 8,380,645 B2 | 2/2013 | Kowalski | |
| 8,402,127 B2 | 3/2013 | Solin | |
| 8,457,928 B2 | 6/2013 | Dang | |
| 8,478,569 B2 | 7/2013 | Scarpelli | |
| 8,554,750 B2 | 10/2013 | Rangaranjan | |
| 8,612,408 B2 | 12/2013 | Trinon | |
| 8,646,093 B2 | 2/2014 | Myers | |
| 8,674,992 B2 | 3/2014 | Poston | |
| 8,689,241 B2 | 4/2014 | Naik | |
| 8,743,121 B2 | 6/2014 | De Peuter | |
| 8,745,040 B2 | 6/2014 | Kowalski | |
| 8,806,621 B2* | 8/2014 | Maguire | G06F 21/552 380/255 |
| 8,812,539 B2 | 8/2014 | Milousheff | |
| 8,818,994 B2 | 8/2014 | Kowalski | |
| 8,832,652 B2 | 9/2014 | Mueller | |
| 8,887,133 B2 | 11/2014 | Behnia | |
| 8,966,639 B1* | 2/2015 | Roytman | H04L 63/1433 726/22 |
| 8,984,643 B1* | 3/2015 | Krisher | H04L 63/1433 726/25 |
| 9,015,188 B2 | 4/2015 | Behne | |
| 9,037,536 B2 | 5/2015 | Vos | |
| 9,065,783 B2 | 6/2015 | Ding | |
| 9,098,322 B2 | 8/2015 | Apte | |
| 9,122,552 B2 | 9/2015 | Whitney | |
| 9,137,115 B2 | 9/2015 | Mayfield | |
| 9,239,857 B2 | 1/2016 | Trinon | |
| 9,317,327 B2 | 4/2016 | Apte | |
| 9,323,801 B2 | 4/2016 | Morozov | |
| 9,363,252 B2 | 6/2016 | Mueller | |
| 9,412,084 B2 | 9/2016 | Kowalski | |
| 9,438,634 B1* | 9/2016 | Ross | H04L 63/20 |
| 9,467,344 B2 | 10/2016 | Gere | |
| 9,501,650 B2* | 11/2016 | Chess | H04L 63/1433 |
| 9,535,737 B2 | 1/2017 | Joy | |
| 9,613,070 B2 | 4/2017 | Kumar | |
| 9,645,833 B2 | 5/2017 | Mueller | |
| 9,654,473 B2 | 5/2017 | Miller | |
| 9,659,051 B2 | 5/2017 | Hutchins | |
| 9,766,935 B2 | 9/2017 | Kelkar | |
| 9,792,387 B2 | 10/2017 | George | |
| 9,805,322 B2 | 10/2017 | Kelkar | |
| 9,819,729 B2 | 11/2017 | Moon | |
| 9,852,165 B2 | 12/2017 | Morozov | |
| 10,002,203 B2 | 6/2018 | George | |
| 10,158,660 B1* | 12/2018 | Reguly | H04L 63/20 |
| 10,462,178 B2* | 10/2019 | Curtis | H04L 63/1433 |
| 2003/0056116 A1* | 3/2003 | Bunker | H04L 63/1433 726/25 |
| 2003/0135749 A1* | 7/2003 | Gales | G06F 21/577 726/25 |
| 2005/0260973 A1* | 11/2005 | van de Groenendaal | H04L 63/102 455/411 |
| 2006/0010497 A1* | 1/2006 | O'Brien | G06Q 10/10 726/26 |
| 2006/0101517 A1* | 5/2006 | Banzhof | G06F 21/577 726/25 |
| 2007/0177615 A1* | 8/2007 | Miliefsky | H04L 29/06027 370/401 |
| 2007/0180509 A1* | 8/2007 | Swartz | G06F 9/4406 726/9 |
| 2007/0192867 A1* | 8/2007 | Miliefsky | H04L 63/20 726/25 |
| 2009/0271863 A1* | 10/2009 | Govindavajhala | H04L 63/1433 726/23 |
| 2011/0179479 A1* | 7/2011 | Tsai | H04L 63/0227 726/13 |
| 2012/0232679 A1* | 9/2012 | Abercrombie | G06Q 10/04 700/44 |
| 2013/0174246 A1* | 7/2013 | Schrecker | H04L 63/1433 726/14 |
| 2013/0247206 A1 | 9/2013 | Hugard, IV et al. | |
| 2013/0318604 A1* | 11/2013 | Coates | H04L 63/1416 726/22 |
| 2015/0040232 A1* | 2/2015 | Oliphant | G06F 21/554 726/25 |
| 2015/0106939 A1* | 4/2015 | Lietz | G06F 21/554 726/25 |
| 2015/0150072 A1* | 5/2015 | Doctor | H04L 63/105 726/1 |
| 2015/0379273 A1* | 12/2015 | Chess | G06F 21/577 726/25 |
| 2016/0378993 A1* | 12/2016 | McGee | G06F 21/577 726/25 |
| 2017/0046519 A1* | 2/2017 | Cam | G06F 21/577 |
| 2017/0142143 A1* | 5/2017 | Seward | G06F 16/212 |
| 2017/0171236 A1* | 6/2017 | Ouchn | H04L 63/1433 |
| 2018/0157842 A1* | 6/2018 | Holz | G06F 21/577 |
| 2018/0348202 A1* | 12/2018 | Kalafatis | G01N 33/5008 |
| 2019/0007458 A1* | 1/2019 | Shulman | H04L 63/1433 |

* cited by examiner

FIG. 5

AUTOMATED VULNERABILITY GROUPING

CROSS-REFERENCE TO RELATED APPLICATION(S)

This application claims the benefit of U.S. Provisional Application No. 62/568,087, filed Oct. 4, 2017, the entire contents of which are hereby incorporated by reference in its entirety.

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Computer resources hosted in distributed computing (e.g., cloud-computing) environments may be disparately located with different resources potentially having their own functions, properties, and/or permissions. Such resources may include hardware resources (e.g. computing devices, switches, etc.) and software resources (e.g. database applications). As networked computer systems become increasingly advanced, these systems may incorporate more and more computer resources, the computer resources increasing a number of variables in the computer systems. These variables may introduce certain vulnerabilities to the system, which may provide avenues for security breach or other undesirable events within the computer system. For example, vulnerabilities may be introduced via software issues (e.g., flaws in software code) and/or at a deployment stage of software (e.g., flaws in configuration of software).

Accordingly, while the capabilities of networked computer systems have increased by incorporating vast arrangement of networked computer systems performing specialized functionality, this growth in complexity has resulted in added complexities in proactively preventing malicious attacks or other undesirable events via introduced system vulnerabilities.

For example, as systems grow larger, significantly more vulnerabilities may be introduced. While scanning technologies can sometimes scan for these vulnerabilities and provide notification of the vulnerabilities, the growing number of vulnerabilities may result in decreased visibility of a desired subset of vulnerabilities.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Information Technology (IT) networks may include a number of computing devices, server systems, databases, and the like that generate, collect, and store information. As increasing amounts of data representing vast resources become available, it becomes increasingly difficult to analyze the data, interact with the data, and/or provide reports for the data. The current embodiments enable customized analysis of such data, enabling predictive forecasting. Further, the current embodiments enable interactivity with this data. The embodiments further provide complex reporting capabilities for the time-series data.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

The description herein makes reference to the accompanying drawings, wherein like reference numerals refer to like parts throughout the several views.

FIG. 5 is an illustration of a GUI for facilitating manual creation of a vulnerability group, in accordance with an embodiment;

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The following discussion relates to analysis, forecasting, and reporting systems for Information Technology (IT) systems. However, this is not meant to limit the current techniques to IT systems. Indeed, the current techniques may be useful in a number of different contexts. For example the current techniques may be applied to Human Resources (HR) systems or any system that may benefit from the analysis, forecasting, and reporting of data.

Keeping this in mind, the discussion now turns to an Information Technology (IT)-centered example. IT devices are increasingly important in an electronics-driven world in which various electronics devices are interconnected within a distributed context. As more functions are performed by services using some form of distributed computing, the complexity of IT network management increases. As management complexities increase, data analysis, forecasting, and reporting may become more complex.

Figure 1:
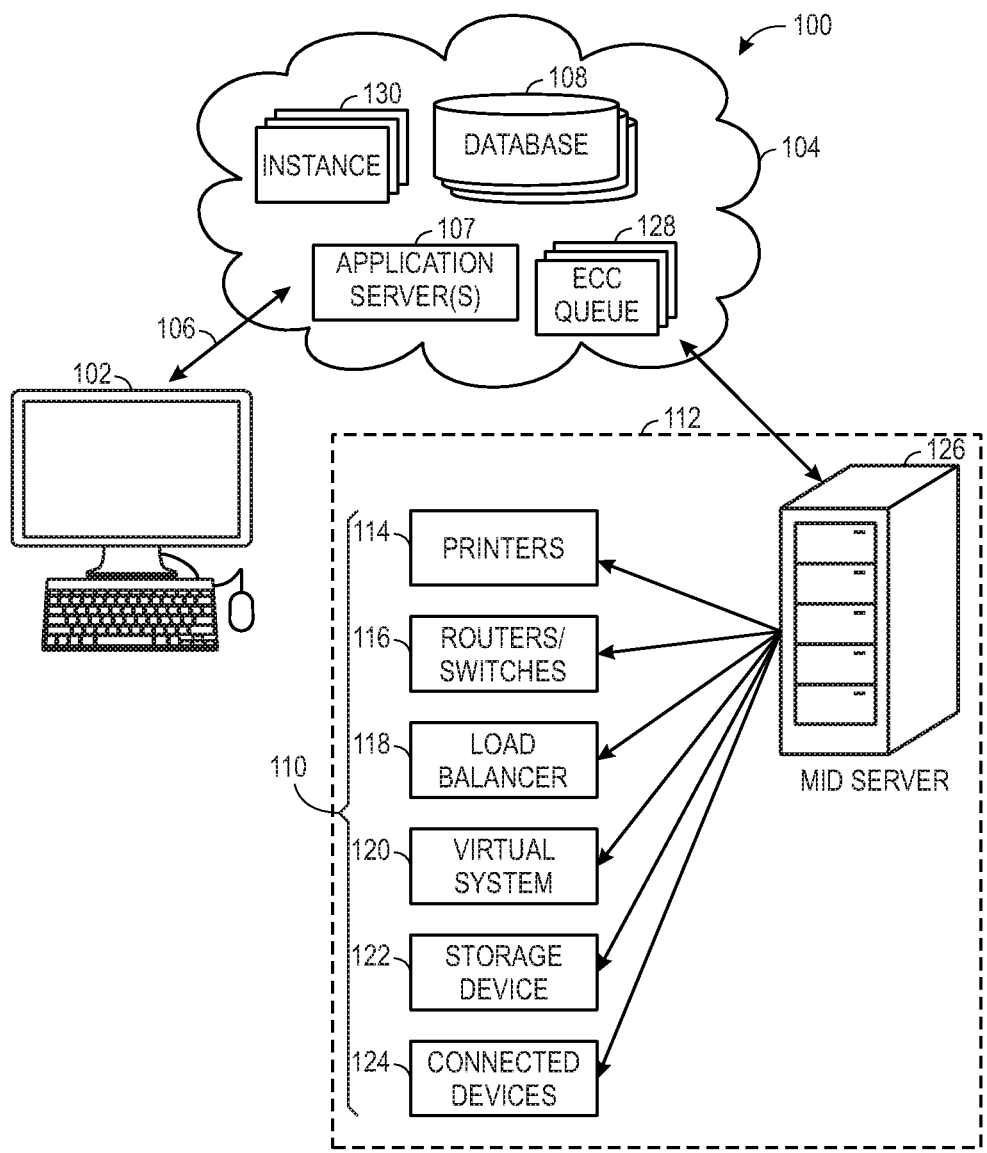
FIG. 1 is a block diagram of a generalized distributed computing system utilizing a cloud service type platform and databases, in accordance with an embodiment.

By way of introduction to the present concepts and to provide context for the examples discussed herein, FIG. 1 is a block diagram of a system 100 that utilizes a distributed computing framework, which may perform one or more of the techniques described herein. As illustrated in FIG. 1, a client 102 communicates with a platform 104, such as a cloud service platform, over a communication channel 106. The client 102 may include any suitable computing system. For instance, the client 102 may include one or more computing devices, such as a mobile phone, a tablet computer, a laptop computer, a notebook computer, a desktop computer, or any other suitable computing device or combination of computing devices. The client 102 may include client application programs running on the computing devices. The client 102 can be implemented using a single physical unit or a combination of physical units (e.g., distributed computing) running one or more client application programs. Furthermore, in some embodiments, a single physical unit (e.g., server) may run multiple client application programs simultaneously.

The platform 104 may include any suitable number of computing devices (e.g., computers) in one or more locations that are connected together using one or more networks. For instance, the platform 104 may include various computers acting as servers in datacenters at one or more geographic locations where the computers communicate using network and/or Internet connections. The communication channel 106 may include any suitable communication mechanism for electronic communication between the client 102 and the platform 104. The communication channel 106 may incorporate local area networks (LANs), wide area networks (WANs), virtual private networks (VPNs), cellular networks (e.g., long term evolution networks), and/or other network types for transferring data between the client 102 and the platform 104. For example, the communication channel 106 may include an Internet connection when the client 102 is not on a local network common with the platform 104. Additionally or alternatively, the communication channel 106 may include network connection sections when the client and the platform 104 are on different networks or entirely using network connections when the client 102 and the platform 104 share a common network. Although only a single client 102 is shown connected to the platform 104, it should be noted that platform 104 may connect to multiple clients (e.g., tens, hundreds, or thousands of clients).

Through the platform 104, here a cloud service type platform, the client 102 may connect to various devices with various functionality, such as gateways, routers, load balancers, databases, application servers running application programs on one or more nodes, or other devices that may be accessed via the platform 104. For example, the client 102 may connect to an application server 107 and/or one or more databases 108 via the platform 104. The application server 107 may include any computing system, such as a desktop computer, laptop computer, server computer, and/or any other computing device capable of providing functionality from an application program to the client 102. The application server 107 may include one or more application nodes running application programs whose functionality is provided to the client via the platform 104. The application nodes may be implemented using processing threads, virtual machine instantiations, or other computing features of the application server 107. Moreover, the application nodes may store, evaluate, or retrieve data from the databases 108 and/or a database server.

The databases 108 may contain a series of tables containing information about assets and enterprise services controlled by a client 102 and the configurations of these assets and services. The assets and services include configuration items (CIs) 110 that may be computers, other devices on a network 112 (or group of networks), software contracts and/or licenses, or enterprise services. The CIs 110 may include hardware resources (such as server computing devices, client computing devices, processors, memory, storage devices, networking devices, or power supplies); software resources (such as instructions executable by the hardware resources including application software or firmware); virtual resources (such as virtual machines or virtual storage devices); and/or storage constructs (such as data files, data directories, or storage models). As such, the CIs 110 may include a combination of physical resources or virtual resources. For example, the illustrated embodiment of the CIs 110 includes printers 114, routers/switches 116, load balancers 118, virtual systems 120, storage devices 122, and/or other connected devices 124. The other connected devices 124 may include clusters of connected computing devices or functions such as data centers, computer rooms, databases, or other suitable devices. Additionally or alternatively, the connected devices 124 may include facility-controlling devices having aspects that are accessible via network communication, such as heating, ventilation, and air conditioning (HVAC) units, fuel tanks, power equipment, and the like. The databases 108 may include information related to CIs 110, attributes (e.g., roles, characteristics of elements, etc.) associated with the CIs 110, and/or relationships between the CIs 110.

In some embodiments, the databases 108 may include a configuration management database (CMDB) that may store the data concerning CIs 110 mentioned above along with data related to various IT assets that may be present within the network 112. The CMDB may include information about the company, departments, who the device is assigned to, who manages the device, the support group/supported by, and domain, etc. This information may be used as grouping criteria in grouping vulnerabilities, as discussed in more detail below. In addition to the databases 108, the platform 104 may include one or more other database servers. The database servers are configured to store, manage, or otherwise provide data for delivering services to the client 102 over the communication channel 106. The database server may include one or more additional databases that are accessible by the application server 107, the client 102, and/or other devices external to the additional databases. By way of example, the additional databases may include a relational database and/or a time series database. The additional databases may be implemented and/or managed using any suitable implementations, such as a relational database management system (RDBMS), a time series database management system, an object database, an extensible markup language (XML) database, a configuration management database (CMDB), a management information base (MIB), one or more flat files, and/or or other suitable non-transient storage structures. In some embodiments, more than a single database server may be utilized. Furthermore, in some embodiments, the platform 104 may have access to one or more databases external to the platform 104 entirely.

In the depicted topology, access to the CIs 110 from the platform 104 is enabled via a management, instrumentation, and discovery (MID) server 126 via an External Communications Channel Queue 128. The MID server 126 may include an application program (e.g., Java application) that runs as a service (e.g., Windows service or UNIX daemon) that facilitates communication and movement of data between the platform 104 and external applications, data sources, and/or services. The MID service 126 may be executed using a computing device (e.g., server or computer) on the network 112 that communicates with the platform 104. As discussed below, the MID server 126 may periodically or intermittently use discovery probes to determine information on devices connected to the network 112 and return the probe results back to the platform 104. In the illustrated embodiment, the MID server 126 is located inside the network 112 thereby alleviating the use of a firewall in communication between the CIs 110 and the MID server 126. However, in some embodiments, a secure tunnel may be generated between a MID server 126 running in the platform 104 that communicates with a border gateway device of the network 112.

The communication channel 128 may be a database table that is typically queried, updated, and inserted into by other systems. Each record in the communication channel queue 128 is a message from an instance in the platform 104 to a system (e.g., MID server 126) external to the platform 104 that connects to the platform 104 or a specific instance 130 running in the platform 104 or a message to the instance from the external system. The fields of an communication channel queue 128 record include various data about the external system or the message in the record.

Although the system 100 is described as having the application servers 107, the databases 108, the communication channel queue 128, the MID server 126, and the like, it should be noted that the embodiments disclosed herein are not limited to the components described as being part of the system 100. Indeed, the components depicted in FIG. 1 are merely provided as example components and the system 100 should not be limited to the components described herein. Instead, it should be noted that other types of server systems (or computer systems in general) may communicate with the platform 104 in addition to the MID server 126 and/or may be used to implement the present approach.

Further, it should be noted that server systems described herein may communicate with each other via a number of suitable communication protocols, such as via wired communication networks, wireless communication networks, and the like. In the same manner, the client 102 may communicate with a number of server systems via a suitable communication network without interfacing its communication via the platform 104.

In addition, other methods for populating the databases 108 may include directly importing the CIs or other entries from an external source, manual import by users entering CIs o or other entries via a user interface, and the like. Moreover, although the details discussed above are provided with reference to the CMDB, it should be understood that the embodiments described herein should not be limited to being performed with the CMDB. Instead, the present systems and techniques described herein may be implemented with any suitable database.

Figure 2:
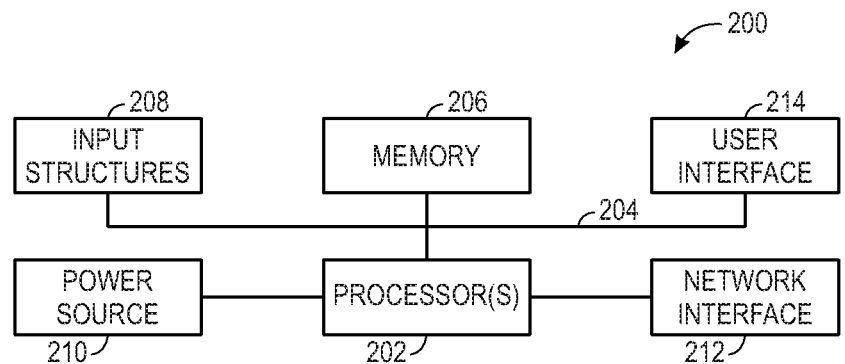
FIG. 2 is a block diagram of a computing device utilized in the distributed computing system of FIG. 1, in accordance with an embodiment.

In any case, to perform one or more of the operations described herein, the client 102, the application servicer 107, the MID server 126, and other server or computing system described herein may include one or more of the computer components depicted in FIG. 2. FIG. 2 generally illustrates a block diagram of example components of a computing device 200 and their potential interconnections or communication paths, such as along one or more busses. As briefly mentioned above, the computing device 200 may be an embodiment of the client 102, the application server 107, a database server (e.g., databases 108), other servers or processor-based hardware devices present in the platform 104 (e.g., server hosting the communication channel queue 128), a device running the MID server 126, and/or any of the CIs. As previously noted, these devices may include a computing system that includes multiple computing devices and/or a single computing device, such as a mobile phone, a tablet computer, a laptop computer, a notebook computer, a desktop computer, a server computer, and/or other suitable computing devices.

As illustrated, the computing device 200 may include various hardware components. For example, the device includes one or more processors 202, one or more busses 204, memory 206, input structures 208, a power source 210, a network interface 212, a user interface 214, and/or other computer components useful in performing the functions described herein.

The one or more processors 202 may include processors capable of performing instructions stored in the memory 206. For example, the one or more processors may include microprocessors, system on a chips (SoCs), or any other suitable circuitry for performing functions by executing instructions stored in the memory 206. Additionally or alternatively, the one or more processors 202 may include application-specific integrated circuits (ASICs), field-programmable gate arrays (FPGAs), and/or other devices designed to perform some or all of the functions discussed herein without calling instructions from the memory 206. Moreover, the functions of the one or more processors 202 may be distributed across multiple processors in a single physical device or in multiple processors in more than one physical device. The one or more processors 202 may also include specialized processors, such as a graphics processing unit (GPU).

The one or more busses 204 includes suitable electrical channels to provide data and/or power between the various components of the computing device. For example, the one or more busses 204 may include a power bus from the power source 210 to the various components of the computing device. Additionally, in some embodiments, the one or more busses 204 may include a dedicated bus among the one or more processors 202 and/or the memory 206.

The memory 206 may include any tangible, non-transitory, and computer-readable storage media. For example, the memory 206 may include volatile memory, non-volatile memory, or any combination thereof. For instance, the memory 206 may include read-only memory (ROM), randomly accessible memory (RAM), disk drives, solid state drives, external flash memory, or any combination thereof. Although shown as a single block in FIG. 2, the memory 206 can be implemented using multiple physical units in one or more physical locations. The one or more processor 202 accesses data in the memory 206 via the one or more busses 204.

The input structures 208 provide structures to input data and/or commands to the one or more processor 202. For example, the input structures 208 include a positional input device, such as a mouse, touchpad, touchscreen, and/or the like. The input structures 208 may also include a manual input, such as a keyboard and the like. These input structures 208 may be used to input data and/or commands to the one or more processors 202 via the one or more busses 204. The input structures 208 may alternative or additionally include other input devices. For example, the input structures 208 may include sensors or detectors that monitor the computing device 200 or an environment around the computing device 200. For example, a computing device 200 can contain a geospatial device, such as a global positioning system (GPS) location unit. The input structures 208 may also monitor operating conditions (e.g., temperatures) of various components of the computing device 200, such as the one or more processors 202.

The power source 210 can be any suitable source for power of the various components of the computing device 200. For example, the power source 210 may include line power and/or a battery source to provide power to the various components of the computing device 200 via the one or more busses 204.

The network interface 212 is also coupled to the processor 202 via the one or more busses 204. The network interface 212 includes one or more transceivers capable of communicating with other devices over one or more networks (e.g., the communication channel 106). The network interface may provide a wired network interface, such as Ethernet, or a wireless network interface, such an 802.11, Bluetooth, cellular (e.g., LTE), or other wireless connections. Moreover, the computing device 200 may communicate with other devices via the network interface 212 using one or more network protocols, such as Transmission Control Protocol/Internet Protocol (TCP/IP), power line communication (PLC), Wi-Fi, infrared, and/or other suitable protocols.

A user interface 214 may include a display that is configured to display images transferred to it from the one or more processors 202. The display may include a liquid crystal display (LCD), a cathode-ray tube (CRT), a light emitting diode (LED) display, an organic light emitting diode display (OLED), or other suitable display. In addition and/or alternative to the display, the user interface 214 may include other devices for interfacing with a user. For example, the user interface 214 may include lights (e.g., LEDs), speakers, and the like.

Figure 3:
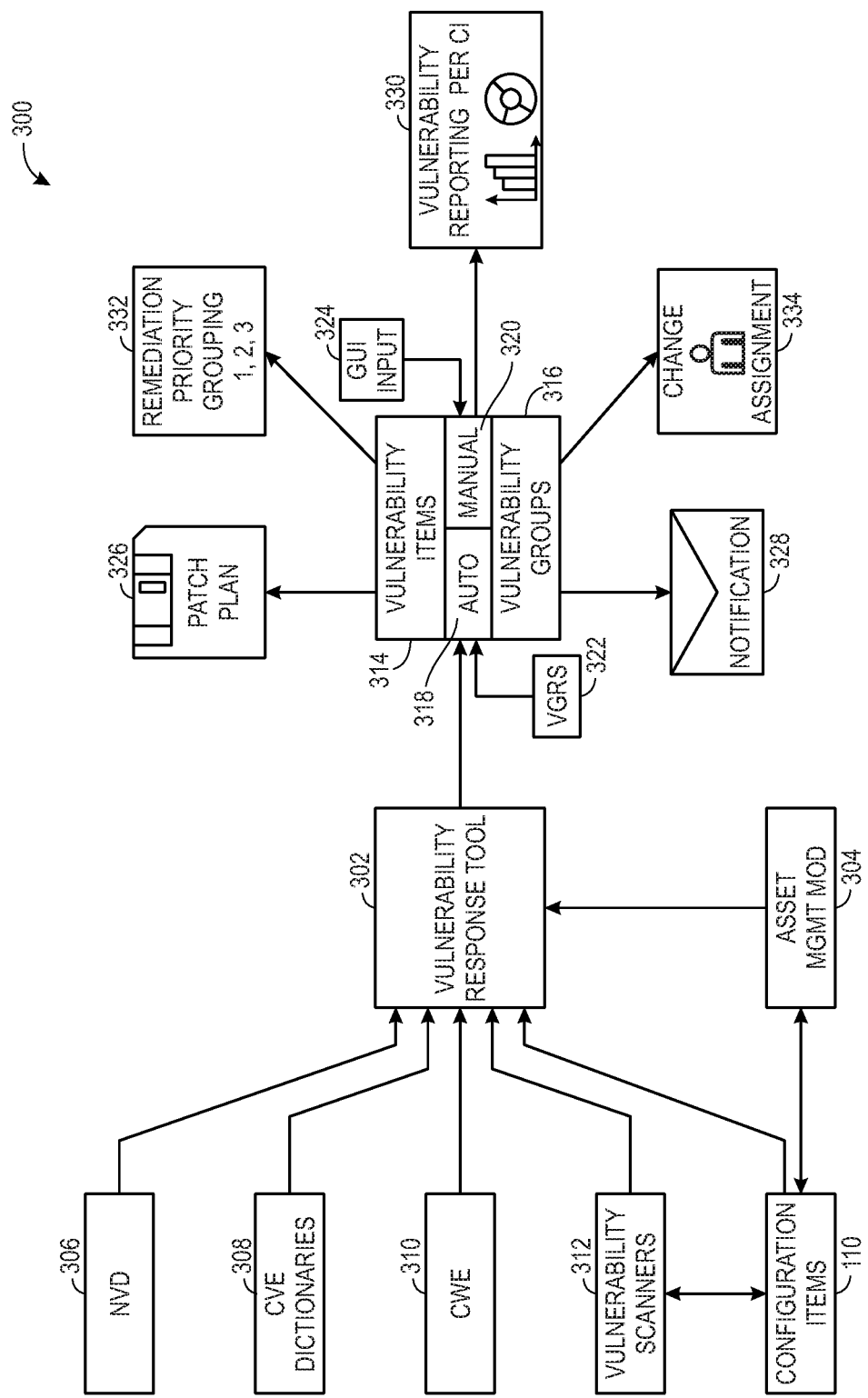
FIG. 3 is a block diagram, illustrating a vulnerability response tool, in accordance with an embodiment.

FIG. 3 is a block diagram, illustrating a vulnerability response system 300, in accordance with an embodiment. Vulnerabilities include weaknesses in software, operating systems, etc. that can be exploited (e.g., are susceptible to malware exploitation and/or other attacks). The vulnerability response system 300 may facilitate management (e.g., control and reporting) of vulnerability items (e.g., configuration items (CIs) 110 with attributed vulnerabilities), by enhancing tracking, prioritizing, and resolving system vulnerabilities.

The Vulnerability Response tool 302 evaluates CIs for known vulnerabilities to find configuration items (CIs) 110 with vulnerable software. For example, an Asset Management module 304 may identify hardware, software, etc. associated with a CI 110 (e.g., by scanning system registries for software licenses, installed hardware, etc.).

Vulnerability data can be pulled from internal and external sources. For example, the National Vulnerability Database (NVD) 306, Common Vulnerability and Exposure (CVE) dictionaries 308, Common Weakness Enumeration (CWE) 310, and many other sources, such as vulnerability scanners, may be used collect information about known vulnerabilities. The CVE dictionaries may be internally and/or externally-provided dictionaries that enumerate information regarding known information-security vulnerabilities and exposures.

For CIs 110 with software affected by a vulnerability, changes, problems, and security incidents may be created via electronic requests sent by the Vulnerability Response Tool 303 to application servers 107 and/or instances 130. The library of Common Weakness Enumeration (CWE) 310 records may be viewed from the NVD 306 to understand how they relate to the Common Vulnerability and Exposure (CVE) records 308. As needed, the system 300 may be updated from the vulnerability databases (e.g., the NVD 306, CVE dictionaries 308, and/or CWE 310) (e.g., on demand or by running user-configured scheduled jobs).

Vulnerability integrations may also provide additional vulnerability insight. For example, security notification services (e.g., Microsoft Security Bulletin) and/or vulnerability scanners 312 may also provide detected vulnerability occurences within the system 300. One such vulnerability scanner 312 may be provided by Qualys. When the Qualys Vulnerability Integration plugin is activated and configured, the Vulnerability Response tool 302 may receive electronic vulnerability data from the scanner 312 in the form of vulnerabilities and vulnerable items.

As mentioned above, the Vulnerability Response Tool 302 may generate vulnerability items 314 that indicate CIs 110 with vulnerabilities. To do this, characteristics of the CIs 110 (e.g., hardware and/or software attributed to the CIs 110) are compared to characteristics of the vulnerabilities (e.g., provided by the NVD 306, the CVE dictionaries 308, the CWE 310, the vulnerability scanners 312, etc.). For example, one characteristic of a CI 110 may be that it is running a certain version of an Operating System, a certain version of an application, etc. The NVD 306 may indicate that there is a vulnerability associated with the certain version of the operating system and/or the certain version of the application. Accordingly, the configuration item would indicate that there is a vulnerability on the particular CI 110 running the certain version of the operating system and/or application.

As may be appreciated, with a significant number of vulnerabilities and/or configuration items 110, the number of vulnerable items 314 generated by the Vulnerability Response Tool 302 may be large. Accordingly, users may be inundated with a large number of vulnerability items without an ability to pinpoint particular vulnerability items of interest. Accordingly, vulnerability items 314 may be grouped into vulnerability groups 316 that may allow more granular reporting, control, and/or remediation of vulnerability items 314. Vulnerability groups 316 may be automatically generated and populated, as illustrated by functionality 318 and/or manually created and populated, as illustrated by functionality 320. Automatic grouping functionality 318 may intake vulnerability group rules (VGRs) 322 to identify vulnerability items 314 the comport to criteria of the VGRs 322, assigning the vulnerability items 314 to an automatically generated vulnerability group 316 associated with the VGRs 322. Additionally and/or alternatively, the manual grouping functionality 320 may receive a graphical user interface (GUI) input 324 that explicitly indicates a user's preference for bundling one or more vulnerability items 314 into a manually created vulnerability group 316. These processes are discussed in more detail below.

Using the generated vulnerability items 314 and/or vulnerability groups 316, additional control, reporting, and remediation may be electronically facilitated within the system 300. For example, a patch plan 326 may be automatically generated by the system 300. This may be done by retrieving patches associated with vulnerabilities of the vulnerability items 314 and/or vulnerability groups 316 (e.g., retrieved from the NVD 306, the CVE dictionaries 308, the CWE 310, the scanners 312, etc.). Additionally and/or alternatively, notifications 328 (e.g., e-mail notifications, GUI notifications, etc.) may be generated for vulnerability items 314 and/or vulnerability groups 316. Charts, graphs, and/or other reporting 330 for the vulnerability items 314 and/or vulnerability groups 316, prioritization 332, and/or change management assignments 334 may also be generated and presented by the system 300 for the vulnerability items 314 and/or the vulnerability groups 316.

Figure 4:
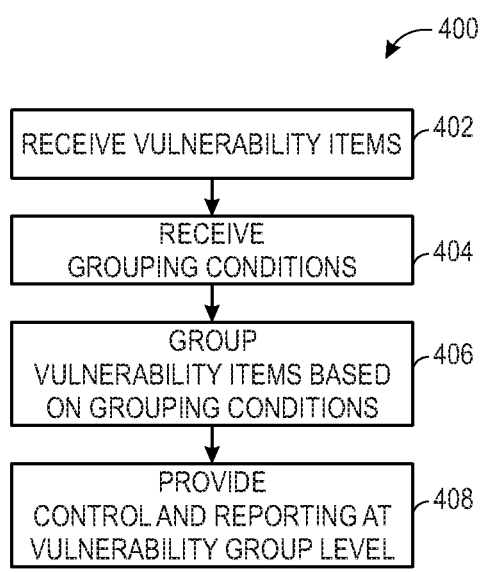
FIG. 4 is a flowchart, illustrating a process for grouping vulnerability items, in accordance with an embodiment.

FIG. 4 is a flowchart, illustrating a process 400 for grouping vulnerability items 314, in accordance with an embodiment. The process 400 includes receiving vulnerability items 314 to group (block 402). As mentioned above, vulnerability items 314 are CIs 110 with associated vulnerabilities (e.g., as described by internal and/or external vulnerability integrations, etc.). Grouping conditions are received (block 404). The grouping conditions may include particular vulnerabilities, particular vulnerability item conditions, and/or a filtering conditions. Further, vulnerability items 314 may belong to more than one vulnerability group 316. The process 400 includes grouping each of the vulnerability items based upon the grouping conditions (block 406). Once grouped, the vulnerability groups may be used to control, report, and/or remediate entire groups of vulnerability items 314 in a vulnerability group 316 (block 408). This may facilitate rapid response to vulnerabilities by managing vulnerability items at a higher granularity than an individual vulnerability item.

Figure 5:
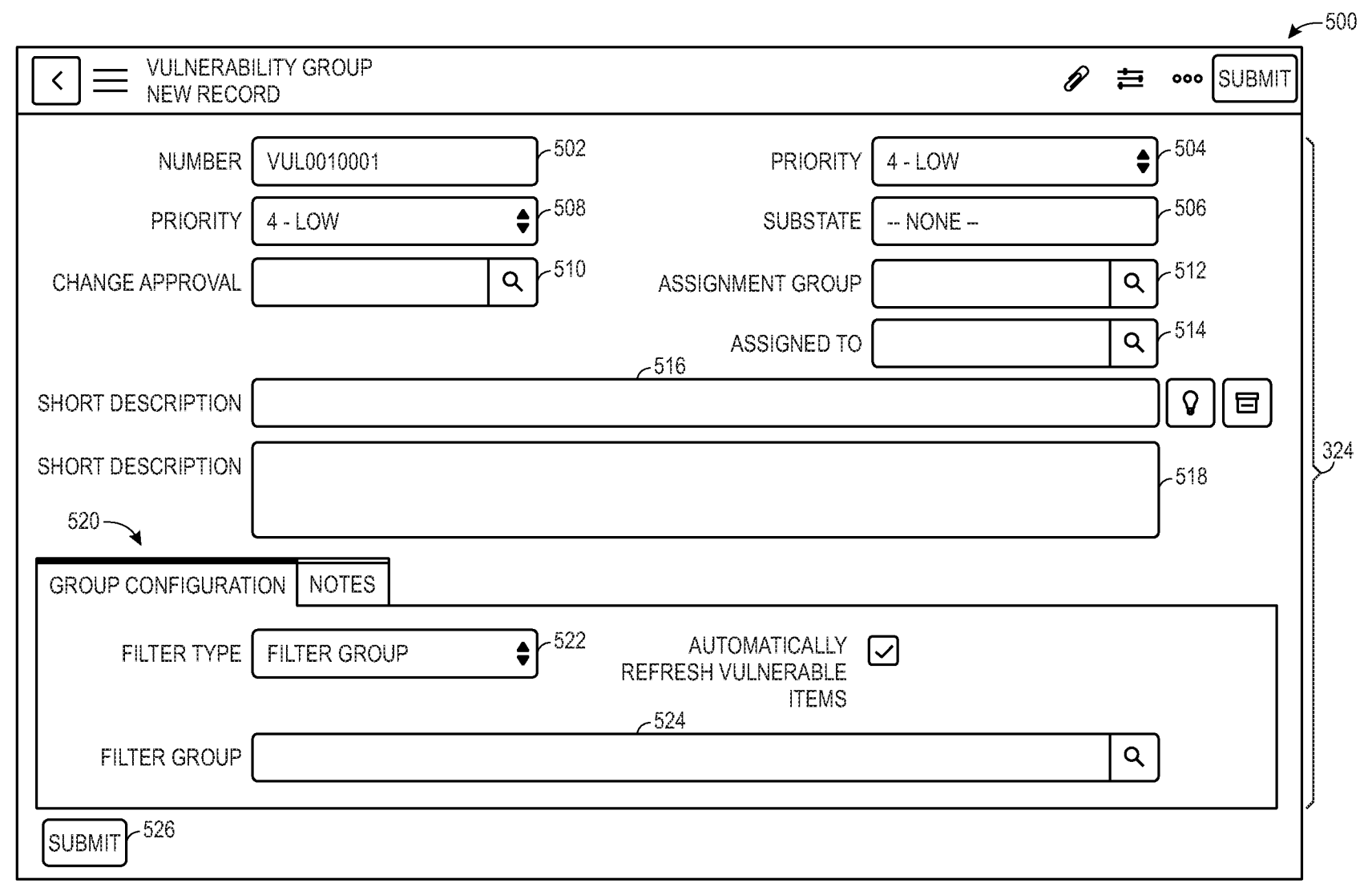

FIG. 5 is an illustration of a GUI 500 for facilitating manual creation functionality 320 of a vulnerability group 316, in accordance with an embodiment. As previously mentioned, vulnerability groups 316 may be created via manual creation functionality 320, by using GUI 500 inputs 324. Upon requesting, via a GUI, the creation of a vulnerability group 316, the GUI 500 may be presented. A unique identifier 502 may identify the vulnerability group 316.

Further, characteristics of the vulnerability group 316 may be set. The characteristics set for a vulnerability group 316 may be propagated to all vulnerability items 314 associated with the vulnerability group 316. For example, a state 504 may be provided for the vulnerability group 316. State 504 may include a "New" state for newly created groups 316, an "In Review" state indicating that approval is needed for a requested state change, a "Fixed" indicating that the vulnerability group 316 has been resolved, "Closed" indicating that vulnerability group 316 has been closed, and/or an "Ignored" state indicating that the vulnerability group 316 has been ignored. When selected, the state 504 may be propagated to the vulnerability items 314 associated with the vulnerability group 316.

In some scenarios, it may be useful to provide a sub state 506 based upon a particular selected state 504. For example, if the vulnerability group 316 has a state 504 marked as "Closed" or "Ignored", the sub state 506 may be marked as False Positive, Risk Accepted, Irrelevant, or some other sub state (e.g., either from an enumerated list or unfixed).

A priority 508 (e.g., Low, Medium, High, etc.) for the vulnerability group 316 may also be set. The priority determines the sequence in which the vulnerability is addressed based on its impact and urgency.

The change approval 510 characteristic automatically displays the change approval currently used for this vulnerability group, while the Assignment group 512 and Assigned to 514 characteristics provide a group to work on the vulnerability group 316 and an individual from the assignment group that is charged with the vulnerability group 316, respectively. The short description 516 characteristic provides a brief description of the vulnerability group 516, while the description 518 characteristic provides a longer description of the vulnerability group 516.

The group configuration area 520 may provide a filter type selection 522 that enables selection of a type of filtering to use to select vulnerability items for the vulnerability group 316. For example, choices may include: "Vulnerability" when the group 316 should group vulnerability items by a common vulnerability, "Condition" when custom grouping criteria (e.g., Priority "High" and Asset Class="Server") is desired to be set, and/or "Filter group" when a created filter grouping will be selected for the grouping. Filter groups may contain dynamically updated records, a series of static records that are not filtered using conditions, or a combination of dynamically updated and static records. Some filter groups are included in the base system, for example, CI exclusions. When "Filter group" is selected from the Filter type 522, the Filter group selector 524 is displayed, enabling a user to select a filter group. The manually created vulnerability group 316 may be generated upon selecting the Submit button 526.

Figure 6:
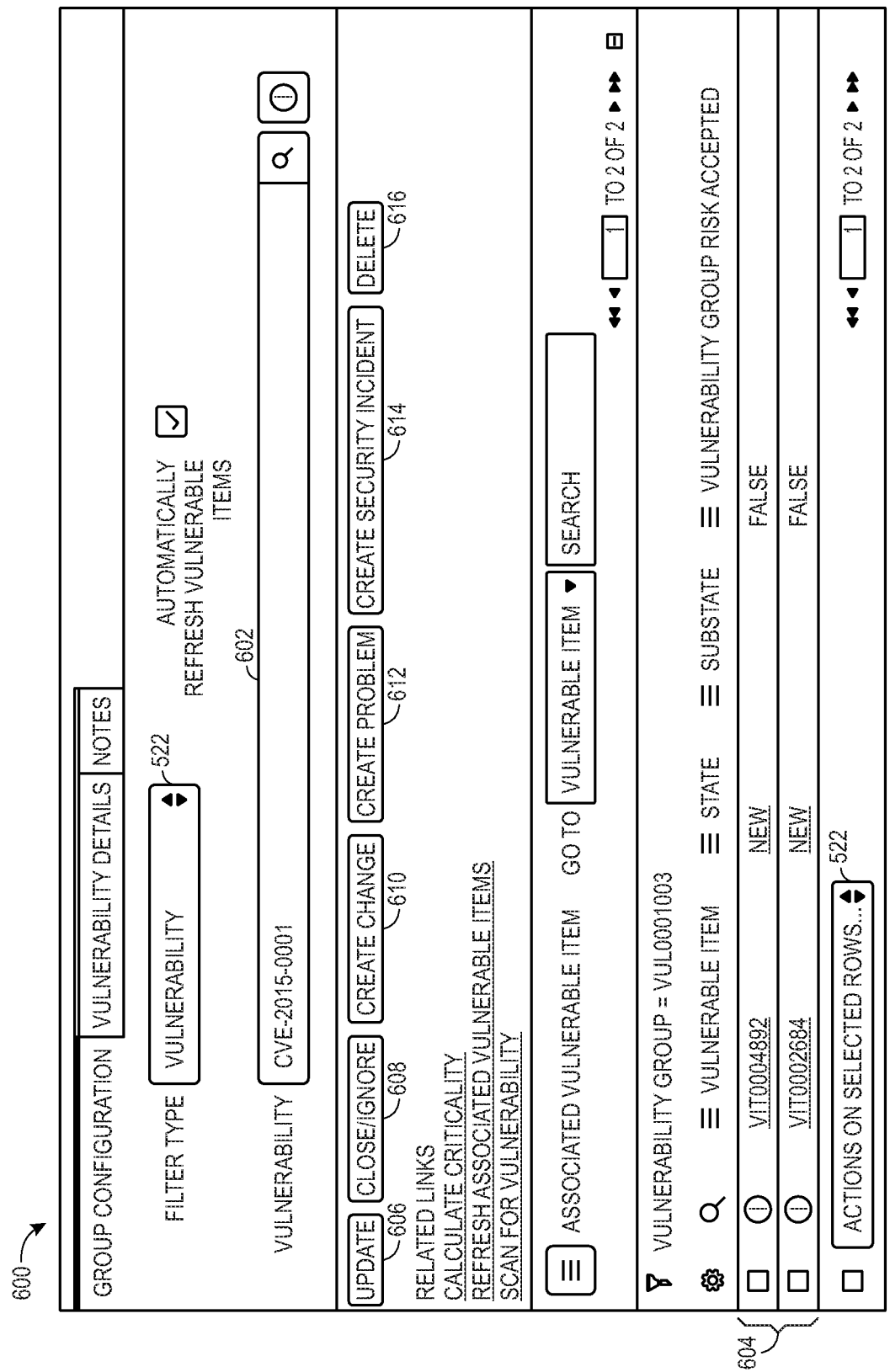
FIG. 6 is an illustration of a GUI for viewing vulnerable items associated with a particular vulnerability group, in accordance with an embodiment.

FIG. 6 is an illustration of a GUI 600 for viewing vulnerable items associated with a particular vulnerability group 316, in accordance with an embodiment. The current vulnerability group 316 has the filter type 522 set to "Vulnerability" and has a vulnerability selector 602 set to "CVE-2015-0001." Accordingly, all vulnerability items 314 with the "CVE-2015-0001" vulnerability will be added to the current vulnerability group 316. For example, vulnerability items 604 (e.g., VIT0004892 and VIT0002684) are associated with the current group 316, based upon being associated with vulnerability CVE-2015-0001. As previously mentioned, the entire set of vulnerability items 314 for the vulnerability group 316 may be managed together. For example, these vulnerability items 314 may be updated by selecting the update button 606, closed/ignored by selecting the close/ignore button 608, may trigger a change request creation by selecting the create change button 610, may trigger problem creation by selecting the create problem button 612, may trigger creation of a security incident via selection of the create security incident button 614, and/or may be deleted via selection of the delete button 616.

Grouping by vulnerability is merely one criteria that can be used in vulnerability grouping. Many other grouping criteria may be used to automatically group vulnerabilities. For example, information from the CMDB, such as: information about the company, departments, who the device is assigned to, who manages the device, the support group/ supported by, and domain, etc. may be used in vulnerability grouping. This may enable specific groups of vulnerabilities supported by particular groups and/or individuals to be automatically grouped, for ease of management, for example.

Figure 7:
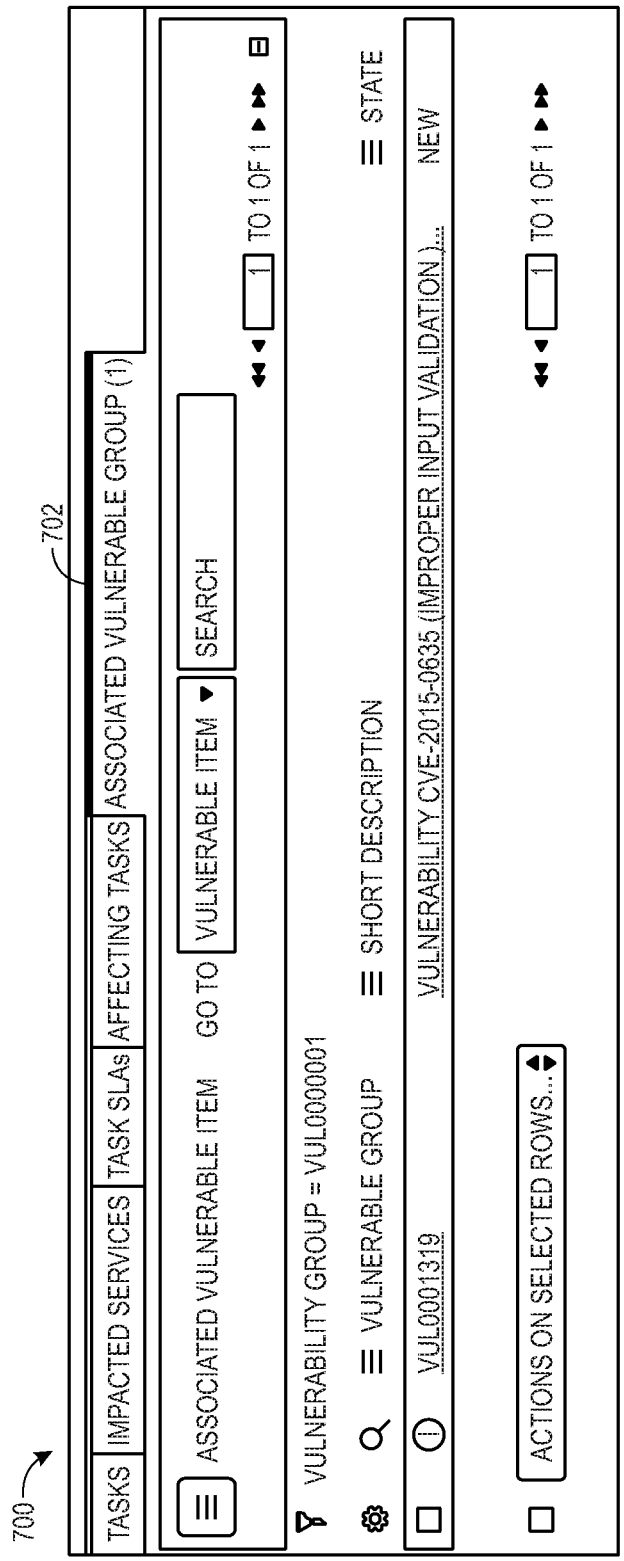
FIG. 7 is an illustration of a GUI for viewing vulnerability groups associated with a particular vulnerable item, in accordance with an embodiment.

FIG. 7 is an illustration of a GUI 700 for viewing vulnerability groups 316 associated with a particular vulnerable item 314, in accordance with an embodiment. When a vulnerability item 314 GUI is presented, the Associated Vulnerable Group(s) section 702 may be presented. In the current example, for the presently selected vulnerability item 314, the Associated Vulnerability Group section 702 indicates a grouping into one vulnerability group 316 (e.g., VUL0001319).

Vulnerability groups 316 enable prioritization and assignment to handle massive numbers of vulnerability items in a system. While users can create their own custom vulnerability groups 316, this may be quite time consuming, especially if each of the massive number of vulnerability items had to be treated in the manual approach. As mentioned above, automatic vulnerability group creation functionality 318 may automatically generate vulnerability groups 316 and automatically group vulnerability items 314 in these groups 316.

Figure 8:
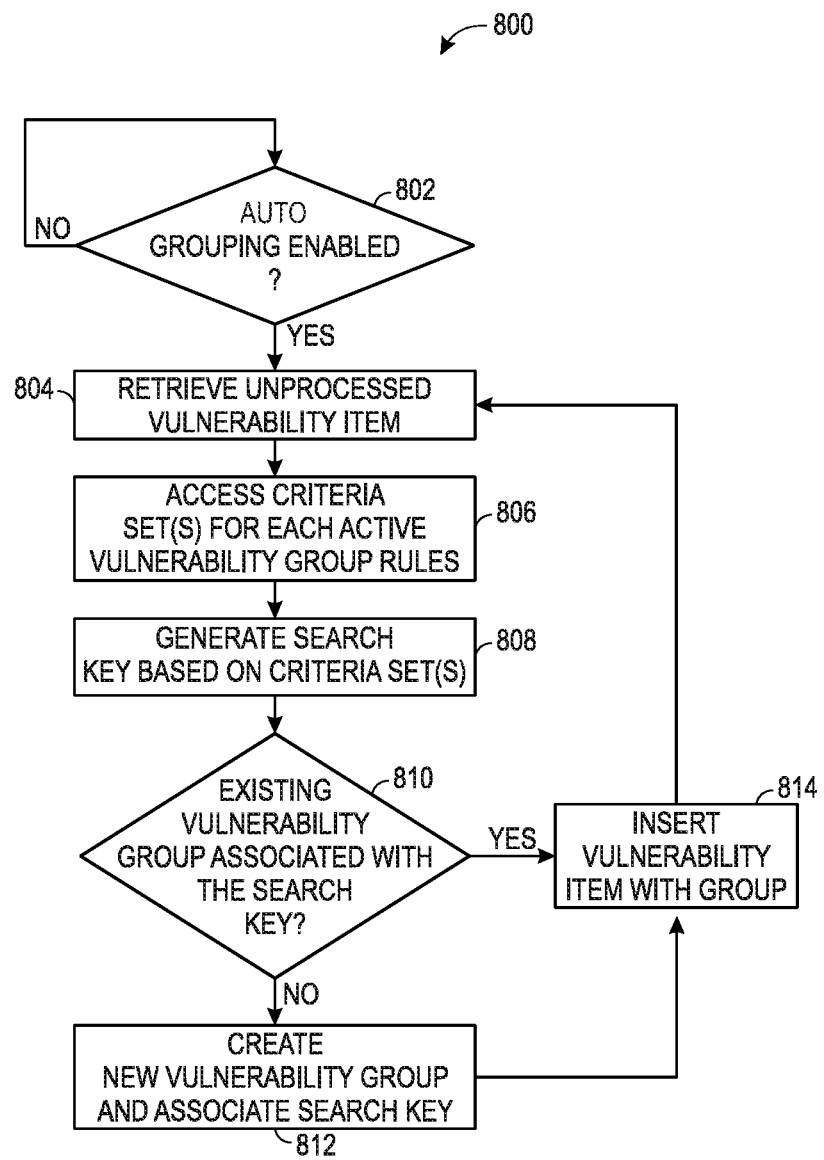
FIG. 8 is a flowchart, illustrating a process for automatically grouping unprocessed vulnerability items, using vulnerability group rules, in accordance with an embodiment.

FIG. 8 is a flowchart, illustrating a process 800 for automatically grouping unprocessed vulnerability items 314, using vulnerability group rules, in accordance with an embodiment. The process 800 begins by determining whether auto-grouping is enabled (decision block 802). The auto-grouping functionality may be enabled by user selection via a GUI of the system 300. If the auto-grouping functionality is not enabled, the process 800 continues monitoring for enablement of the auto-grouping functionality.

When auto-grouping is enabled, unprocessed vulnerability items 314 are retrieved (block 804). For example, a processed indicator may be associated with each of the vulnerability items 314, indicating whether or not the vulnerability items 314 have been processed by the vulnerability group rules (VGRs) 322. The processed indicator may be a field in a relational database, which may include a Yes entry (or a "1" etc.) for those vulnerability items 314 that have previously been grouped in accordance with VGRs 322 and/or a No entry (or a "0" etc.) for those vulnerability items 315 that have not been previously grouped in accordance with VGRs 322.

Criteria sets for each active vulnerability group rule (VGR) 322 are accessed (block 806). VGRs 322 dictate characteristics to be used for auto-generation of vulnerability groups 316 and/grouping vulnerability items 314 within vulnerability groups 316. In some embodiments, VGRs 322 may be prioritized, such that higher priority VGRs are evaluated and implemented before lower-priority VGRs.

An internal key is generated based upon the accessed criteria sets (block 808). The internal key provides a searching mechanism for vulnerability groups 316, such that vulnerability items 314 may be quickly compared with the internal key, to determine whether the vulnerability item 314 should be grouped in the vulnerability group 316. In some embodiments, the internal key is a combination of values for columns identified to be grouped from the VGRs 322. For example, a VGR 322 that indicates grouping by vulnerability only, the internal key for a generated vulnerability group would include the vulnerability identifier of a vulnerability associated with a vulnerability item 314 that the VGR 322 is applied to. For a VGR 322 indicates grouping by vulnerability and a class type of a CI 110, the values of vulnerability item's vulnerability value and class type value may be combined to form the key. For example, for a vulnerability value of "f087ad369f21120034c6b6a0942e7043" and a CI 110 class type of "cmdb_ci_linux_server," the internal key may be generated as: "f087ad369f21120034c6b6a0942e7043:cmdb_ci_linux_server," where the ":" indicates the split between the vulnerability value and the class type value. In some embodiments, a shorted or display-friendly key, such as "QID104934:Linux Server."

An example of internal key generation is now provided. The internal key may be a string generated based upon group by information in a VGR 322. For example, a first VGR may indicate to group by vulnerability identifier and age, while a second VGR may indicate to group by a CI type and age, as illustrated in the table below.

|  | Group By 1 | Group By 2 | Group By 3 |
| --- | --- | --- | --- |
| First VGR | Vulnerability ID | Age |  |
| Second VGR | CI Type | Age |  |

Now, assume that four vulnerability items are present. The first having a vulnerability identifier and an age value, the second having a CI type and age, the third, having an age and an empty vulnerability id (e.g., denoted by "X"), and the fourth having an age and an empty CI type (e.g., as denoted by "X"), as illustrated in the table below.

|  | Vulnerability ID | CI Type | Age |
| --- | --- | --- | --- |
| VI #1 | Abc |  | 3 |
| VI #2 |  | Computer | 6 |
| VI #3 | X |  | 6 |
| VI #4 |  | X | 6 |

As may be appreciated, VIs #1 and #3 may be processed in accordance with VGR1, as these VIs have Vulnerability Id and age values, which are the group by fields of VGR1. VIs #2 and #4 may be processed in accordance with VGR2, as these VIs have CI Type and age values, which are the group by fields of VGR2.

The internal key may provide an indication of a particular VGR that is used to group the VIs. For example, the internal key may include a system ID for the VGR used to group the VIs. Thus, for VIs #1 and #3, a system identifier for VGR1 may be provided in the internal key, as VGR1 is used in the grouping of VIs #1 and #3. Further, VIs #2 and #4, a system identifier for VGR2 may be provided in the internal key, as VGR2 is used in the grouping of VIs #2 and #4.

An ordered set of group by values may also be provided in the internal key. For example, a ":" may separate values of each of the group by fields specified in the VGRs. To account for empty values in the VIs, a null indicator may be inserted into the internal key, to indicate an empty group by value. Thus, for VGR1, values from the VIs #1 and #3 may be ordered as: [Vulnerability ID value]:[age value], resulting in ABC:3 for VI #1 and null:6 for VI #3.

The system indication of the particular VGR used to group the VI may be merged with the ordered set of group by values to form the internal key. For example, in one embodiment, a separator character and/or string may be placed in between the indication of the particular VGR and the ordered set of group by values. In one embodiment, the separator string may be ":groupValue:". This results in [VGR #1 Identifier]:groupValue: ABC:3 for VI #1 and [VGR #1 Identifier]:groupValue:null:6 for VI #3. For VI #2, the internal key would be: [VGR #2 Identifier]:groupValue: computer:6 and for VI #4, the internal key would be: [VGR #2 Identifier]:groupValue:null:6. As may be appreciated, by adding the system identifier of the VGR, unique keys may be generated, that might otherwise appear common. For example, without the identifier as part of the internal key, VI #3 and VI #4 would have a common internal key of null:6, resulting in erroneous common grouping. Thus, the system identifier provides unique grouping for different VGRs.

Once the internal key is generated, a search for existing groups associated with the internal key is performed (decision block 810). The search for an existing group may also include a status criteria for the group. For example, the search may search for existing groups with the status of "new" or "editable", meaning the group is able to accept new vulnerability items. When multiple vulnerability groups exist with the internal key, in some embodiments, the first vulnerability group that is found will be associated with the vulnerability item. In some embodiments, under such a scenario, the vulnerability item will be grouped with each of the vulnerability groups that includes the internal key.

If no existing vulnerability group 316 is associated with the internal key, a new vulnerability group is automatically created and associated with the key (block 812). Search and/or creation of new vulnerability groups based upon VGRs may occur at a pre-determined frequency (e.g., hourly, daily, weekly, etc.). Further, search and/or creation may be triggered by certain events (e.g., triggered at the end of an import of vulnerability data, such as new vulnerability items, etc.).

The vulnerability item 314 is then grouped into the automatically created vulnerability group 316 (block 814) and set to a processed status. For example, a data pointer may link the vulnerability item 314 with the vulnerability group 316 (e.g., in a relational database).

Otherwise, when an existing vulnerability group 316 is associated with the internal key, no new vulnerability group 316 is created, but instead, the vulnerability item 314 is automatically grouped with the existing vulnerability group 316 (block 814). For example, a data pointer may link the vulnerability item 314 with the vulnerability group 316 (e.g., in a relational database).

Using the above-described techniques, enhanced vulnerability monitoring may be provided. By automatically grouping vulnerabilities, a user may more rapidly access particular sets of vulnerability items of interest. This may result in increased network security, by enabling rapid response to vulnerabilities within a network. The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A vulnerability response system comprising:
   a non-transitory memory comprising a vulnerability grouping rule, wherein the vulnerability grouping rule comprises an electronic indication of a group by field, wherein the group by field corresponds to a criteria used to assign each vulnerability item of a set of vulnerability items to one or more vulnerability groups, and wherein the vulnerability grouping rule does not comprise an electronic indication of values stored in the group by field; and
   one or more hardware processors configured to read instructions from the non-transitory memory, wherein the instructions, when executed by the one or more hardware processors, cause the one or more hardware processors to perform operations comprising:
      receiving a plurality of vulnerability items from a vulnerability response tool configured to compare indications of known vulnerabilities with indications of software, hardware, or both used in respective configuration items to identify a subset of configuration items configured to use hardware, software, or both that comprise an identified vulnerability as the plurality of vulnerability items;
      accessing the vulnerability grouping rule;
      for each of the plurality of vulnerability items:
         searching a configuration database to identify a value stored in a column identified to be grouped as indicated by the group by field indicated in the vulnerability grouping rule;
         generating a key based at least in part on the value stored in the column identified to be grouped by the group by field indicated in the vulnerability grouping rule;
         identifying whether any pre-existing vulnerability groups correspond to the key;
         when a pre-existing vulnerability group corresponds to the key, grouping the vulnerability item with the pre-existing vulnerability group; and
         otherwise, when none of the pre-existing vulnerability groups correspond to the key:
            generating a vulnerability group associated with the key and
            associating the vulnerability item to the vulnerability group; and
      setting a priority for at least one of the vulnerability groups, wherein the priority is presented on a graphical user interface and used to define a sequence in which vulnerabilities of the configuration items are addressed.

2. The vulnerability response system of claim 1, wherein the operations comprise:
   generating the key at least in part by providing punctuation between the value of the group by field and an additional value.

3. The vulnerability response system of claim 2, wherein the operations comprise:
   providing an identifier of the vulnerability grouping rule as the additional value.

4. The vulnerability response system of claim 3, wherein the operations comprise:
   providing a class type value as the value.

5. The vulnerability response system of claim 1, wherein the operations comprise:
   determining that auto-grouping is enabled via a user-defined setting of the graphical user interface; and
   automatically grouping the plurality of vulnerability items in response to determining that the auto-grouping is enabled.

6. The vulnerability response system of claim 1, wherein the operations comprise:
   performing a control operation, a reporting operation, or both, based upon at least one of the vulnerability groups.

7. The vulnerability response system of claim 6, wherein the operations for performing the control operation comprise generating a patch plan, generating a change assignment, or any combination thereof.

8. The vulnerability response system of claim 6, wherein the operations for performing the reporting operation comprise providing statistics regarding the vulnerability group, providing an electronic notification regarding the vulnerability group, or both.

9. The vulnerability response system of claim 1, wherein the indications of known vulnerabilities are pulled from an internal source, an external source, or both.

10. The vulnerability response system of claim 1, wherein the indications of known vulnerabilities are accessed from a database, a dictionary, an output from a vulnerability scanner, or any combination thereof.

11. The vulnerability response system of claim 1, wherein the vulnerabilities of the configuration items are addressed with a same remediation when the configuration items correspond to a same vulnerability group.

12. The vulnerability response system of claim 1, the operations comprising:
  setting a state for the vulnerability group as new; and
  after remediating the vulnerability item of the vulnerability group, setting the state as fixed to indicate that the vulnerability group has been resolved.

13. A tangible, non-transitory, machine-readable medium, comprising machine-readable instructions that, when executed by one or more processors, cause the one or more processors to perform operations comprising:
  receiving a plurality of vulnerability items from a vulnerability response tool configured to compare indications of known vulnerabilities with indications of software, hardware, or both used in respective configuration items to identify a subset of configuration items configured to use hardware, software, or both that comprise an identified vulnerability as the plurality of vulnerability items;
  accessing a vulnerability grouping rule, wherein the vulnerability grouping rule comprises an electronic indication of a group by field, wherein the group by field corresponds to a criteria used to assign each vulnerability item of the plurality of vulnerability items to one or more vulnerability groups, and wherein the vulnerability grouping rule does not comprise an electronic indication of values stored in the group by field;
  for each of the plurality of vulnerability items:
    searching a configuration database to identify a value stored in a column identified to be grouped as indicated by the group by field indicated in the vulnerability grouping rule;
    generating a key based at least in part on the value stored in the column identified to be grouped by the group by field indicated in the vulnerability grouping rule;
    identifying whether any pre-existing vulnerability groups correspond to the key;
    when a pre-existing vulnerability group corresponds to the key, group the vulnerability item with the pre-existing vulnerability group; and
    otherwise, when none of the pre-existing vulnerability groups correspond to the key:
      generating a vulnerability group associated with the key; and
      associating the vulnerability item to the vulnerability group; and
  setting a priority for at least one of the vulnerability groups, wherein the priority is rendered on a graphical user interface and used to define a sequence in which vulnerabilities of the configuration items are addressed.

14. The machine-readable medium of claim 13, the operations comprising generating the key as comprising an identifier of the vulnerability grouping rule, the value, or both.

15. The machine-readable medium of claim 13, the operations comprising associating the vulnerability group with the key, such that the vulnerability group can be subsequently searched as one of the pre-existing vulnerability groups using a subsequent key.

16. The machine-readable medium of claim 13, the operations comprising:
  determining that an auto-grouping setting is enabled; and
  in response to determining that the auto-grouping setting is enabled, receiving the plurality of vulnerability items.

17. A method, comprising:
  receiving a plurality of vulnerability items from a vulnerability response tool configured to compare indications of known vulnerabilities with indications of software, hardware, or both used in respective configuration items to identify a subset of configuration items configured to use hardware, software, or both that comprise an identified vulnerability as the plurality of vulnerability items;
  accessing a vulnerability grouping rule, wherein the vulnerability grouping rule comprises an electronic indication of a group by field, and wherein the group by field corresponds to a criteria used to assign each vulnerability item of the plurality of vulnerability items to one or more vulnerability groups, wherein the electronic indication of the group by field is independent of an electronic indication of values stored in group by fields;
  for each of the plurality of vulnerability items:
    searching a configuration database to identify a value stored in a column identified to be grouped as indicated by the group by field indicated in the vulnerability grouping rule;
    generating a key based at least in part on the value stored in the column identified to be grouped by the group by field indicated in the vulnerability grouping rule;
    identifying whether any pre-existing vulnerability groups correspond to the key;
    when a pre-existing vulnerability group corresponds to the key, grouping the vulnerability item with the pre-existing vulnerability group; and
    otherwise, when none of the pre-existing vulnerability groups correspond to the key:
      generating a vulnerability group associated with the key; and
      associating the vulnerability item to the vulnerability group; and
  setting a priority for at least one of the vulnerability groups, wherein the priority is rendered on a graphical user interface and used to define a sequence in which the at least one of the vulnerability groups is remedied relative to an additional vulnerability group.

18. The method of claim 17, wherein generating the key comprises:
  generating the key as comprising an identifier of the vulnerability grouping rule, the value, or both.

19. The method of claim 18, wherein generating the key comprises:
  associating the vulnerability group with the key, such that the vulnerability group can subsequently be searched as one of the pre-existing vulnerability groups using a subsequent key.

20. The method of claim 17, wherein the vulnerability response tool is configured to perform a scan of a distributed computing system to identify the vulnerability items based at least in part on a known vulnerability, and wherein the scan is proactively performed to prevent an attack via system vulnerabilities of the distributed computing system.

\* \* \* \* \*